(12) United States Patent
Park et al.

(10) Patent No.: US 11,799,510 B2
(45) Date of Patent: Oct. 24, 2023

(54) METHODS FOR CONFIGURING RADIO RESOURCES IN A WIRELESS COMMUNICATION SYSTEM AND APPARATUSES

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 337 days.

(21) Appl. No.: 15/672,357

(22) Filed: Aug. 9, 2017

(65) Prior Publication Data

US 2018/0048346 A1 Feb. 15, 2018

(30) Foreign Application Priority Data

Aug. 11, 2016 (KR) .......................... 10-2016-0102629
May 29, 2017 (KR) .......................... 10-2017-0065822

(51) Int. Cl.
*H04B 1/44* (2006.01)
*H04L 5/00* (2006.01)
(Continued)

(52) U.S. Cl.
CPC ............... *H04B 1/44* (2013.01); *H04L 5/003* (2013.01); *H04L 5/0039* (2013.01); *H04L 5/0064* (2013.01); *H04L 5/0023* (2013.01); *H04L 5/0035* (2013.01); *H04L 5/14* (2013.01); *H04W 72/21* (2023.01); *H04W 72/23* (2023.01)

(58) Field of Classification Search
CPC ..... H04W 16/00; H04W 16/02; H04W 16/04; H04W 16/12; H04W 28/00; H04W 72/1284; H04W 72/1289; H04W 28/20; H04W 72/0413; H04W 72/042; H04B 1/44; H04L 5/0064; H04L 5/0039; H04L 5/003; H04L 5/0035; H04L 5/0023; H04L 5/14
See application file for complete search history.

(56) References Cited

U.S. PATENT DOCUMENTS 10,285,028 B2 * 5/2019 Chincholi ................. H04L 1/00
10,341,994 B2 * 7/2019 Balachandran ..... H04W 72/048
(Continued)

FOREIGN PATENT DOCUMENTS

KR   10-2016-0089844 A    7/2016
WO       2016/038510 A1   3/2016

OTHER PUBLICATIONS

Interdigital, "On narrowband configuration for MTC UE", R1-154563, 3GPP TSG RAN WG1 Meeting #82, Beijing, China, Aug. 24-28, 2015, pp. 1-2.

(Continued)

*Primary Examiner* — Romani Ohri
(74) *Attorney, Agent, or Firm* — IP Legal Services, LLC

(57) ABSTRACT

A method may be provided for configuring an up/down link radio resource for a machine type communication (MTC) terminal in 3GPP LTE/LTE-advanced system. The method may include configuring up/downlink narrowband for further enhanced MTC terminal which supports a up/downlink data channel (that is, PDSCH and PUSCH) bandwidth enhanced as compared with the MTC terminal (BL/CE UE) defined in LTE rel-13.

12 Claims, 4 Drawing Sheets

(51) Int. Cl.
    *H04L 5/14*           (2006.01)
    *H04W 72/21*       (2023.01)
    *H04W 72/23*       (2023.01)

(56) References Cited

U.S. PATENT DOCUMENTS

| | | | |
|---|---|---|---|
| 2008/0159323 A1* | 7/2008 | Rinne | H04L 1/001 370/431 |
| 2013/0064119 A1* | 3/2013 | Montojo | H04W 52/265 370/252 |
| 2013/0182661 A1* | 7/2013 | Piipponen | H04W 72/0473 370/329 |
| 2014/0036859 A1* | 2/2014 | Ekpenyong | H04W 72/042 370/330 |
| 2015/0016387 A1* | 1/2015 | Elmdahl | H04W 52/0206 370/329 |
| 2015/0215089 A1* | 7/2015 | Yan | H04L 1/1893 370/329 |
| 2016/0044642 A1* | 2/2016 | Xu | H04W 4/70 370/329 |
| 2016/0072614 A1 | 3/2016 | Blankenship et al. | |
| 2016/0227345 A1* | 8/2016 | Xu | H04L 5/0053 |
| 2016/0227582 A1 | 8/2016 | Vajapeyam et al. | |
| 2016/0234707 A1* | 8/2016 | Kazmi | H04W 24/08 |
| 2016/0249327 A1* | 8/2016 | Chen | H04L 5/0039 |
| 2016/0270038 A1* | 9/2016 | Papasakellariou | H04L 1/18 |
| 2016/0323901 A1* | 11/2016 | Yum | H04L 5/0057 |
| 2016/0338062 A1* | 11/2016 | Rico-Alvarino | H04W 72/0453 |
| 2017/0230156 A1* | 8/2017 | Fakoorian | H04W 72/542 |
| 2018/0049201 A1* | 2/2018 | Hussain | H04L 1/0001 |
| 2018/0069672 A1* | 3/2018 | Horiuchi | H04W 72/042 |
| 2018/0115943 A1* | 4/2018 | Park | H04W 4/029 |

OTHER PUBLICATIONS

Ericsson, "PRB group definition for MTC", R1-153723, 3GPP TSG RAN WG1 Meeting #82, Beijing, China, Aug. 24-28, 2015, pp. 1-7.
Ericsson, "PRB grouping for MTC", R1-151207, 3GPP TSG RAN WG1 Meeting #80bis, Belgrade, Serbia, Apr. 20-24, 2015, pp. 1-4.
LG Electronics, "Further details on narrowbands and frequency hopping", R1-154227, 3GPP TSG RAN WG1 Meeting #82, Beijing, China, 24th-28th 2015, pp. 1-8.
LG Electronics, "narrowband definition and hopping pattern across narrowbands", R1-152694, 3GPP TSG RAN WG1 Meeting #81, Fukuoka, Japan, May 25-29, 2015.
LG Electronics, "WF on Narrowband Definition for Rel-13 MTC UEs", R1-153498, 3GPP TSG RAN WG1 #81, Fukuoka, Japan, May 25-29, 2015.
State Intellectual Property Office of People's Republic of China, Office Action of corresponding CN Patent Application No. 201710670765.X, dated Nov. 27, 2020.

* cited by examiner

METHODS FOR CONFIGURING RADIO RESOURCES IN A WIRELESS COMMUNICATION SYSTEM AND APPARATUSES

CROSS-REFERENCE TO RELATED APPLICATIONS

This application claims priority from Korean Patent Application Nos. 10-2016-0102629 and 10-2017-0065822, filed on Aug. 11, 2016 and May 29, 2017, which are hereby incorporated by reference for all purposes as if fully set forth herein.

BACKGROUND OF THE INVENTION

Field of the Invention

The present exemplary embodiments relate to a method and an apparatus for configuring uplink/downlink radio resources in a wireless communication system.

Description of the Related Art

As an long term evolution (LTE)/LTE-advanced network spreads, mobile communication service providers want to minimize a number of radio access terminals (RAT) to reduce a network maintenance cost.

However, due to abrupt increment in machine type communication (MTC) products based on a typical global systems for mobile communication (GSM)/general packet radio service (GPRS) network, there is a problem in that the mobile communication service providers need to separately operate two RATs, one using an LTE/LTE-advanced network for general data transmission and the other using a GSM/GPRS network for an MTC.

Therefore, in order to reduce a cost of the terminal as compared with the typical LTE/LTE-advanced terminal, a bandwidth reduced low complexity user equipment (BL UE) is defined, and a standard technology for supporting the BL UE is defined in 3GPP Release-13. For example, the BL UE has limitation on a transmission/reception bandwidth, such as the transmission/reception bandwidth is limited to six physical resource blocks (PRBs) and the number of transmission/reception antennae is limited to 1.

Further, in consideration of an MTC application scenario such as smart metering installed in a 'deep indoor' environment such as a basement, a coverage enhancement (CE) mode is defined as a CE UE, and a standard technology for supporting the CE UE is defined in 3GPP Release-13.

Since additional enhancement for the BL/CE UE defined in 3GPP Release-13 will be discussed in 3GPP Release-14, a method may be required for configuring a radio resource which may support an uplink/downlink channel bandwidth extended as compared with the BL/CE UE of 3GPP Release-13.

SUMMARY OF THE INVENTION

An object of the present exemplary embodiments is to provide a method and an apparatus for configuring an uplink/downlink radio resource in a wireless communication system to support an uplink/downlink channel bandwidth extended as compared with BL/CE UE defined in 3GPP Release-13.

According to an aspect of the present exemplary embodiments, there is provided a method for configuring an uplink radio resource in a wireless communication system including configuring a narrowband defined as six consecutive physical resource blocks which configure a uplink system bandwidth and configuring a wideband defined as K non-overlapping narrowbands in the narrowbands which configure the system bandwidth.

According to another aspect of the present exemplary embodiments, there is provided a method for configuring a downlink radio resource in a wireless communication system including configuring a narrowband defined as six consecutive physical resource blocks which configure a downlink system bandwidth and configuring a wideband defined as K non-overlapping narrowbands in the narrowbands which configure the system bandwidth.

According to another aspect of the present exemplary embodiments, there is provided a method for configuring a radio resource in a wireless communication system, including: configuring a narrowband defined as six consecutive physical resource blocks in a frequency domain; and configuring a wideband defined as K non-overlapping narrowbands in the frequency domain.

According to the present exemplary embodiments, it is possible to configure an uplink/downlink radio resource extended as compared with BL/CE UE defined in 3GPP Release-13.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
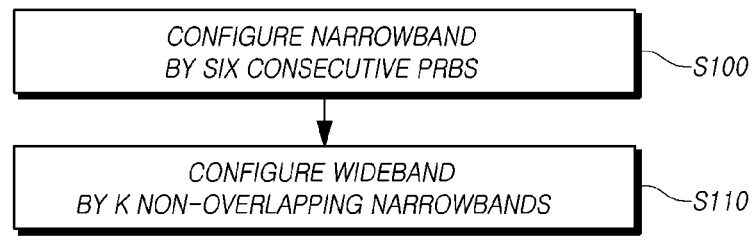
FIG. 1 is a view illustrating a method for configuring a radio resource in a wireless communication system according to an exemplary embodiment.

Hereinafter, some exemplary embodiments of the present disclosure will be described in detail with reference to the accompanying drawings. When reference numerals denote components in the drawings, even though the like components are illustrated in different drawings, it should be understood that like reference numerals refer to the same components. In addition, in the description of the present disclosure, the detailed descriptions of publicly known related constitutions or functions thereof may be omitted if they make the gist of the present disclosure unclear.

In this specification, an machine type communication (MTC) terminal may refer to a terminal which supports a low cost (or low complexity) or a terminal which supports coverage enhancement. In this specification, an MTC terminal may refer to a terminal which supports a low cost (or low complexity) and coverage enhancement. Alternatively, in this specification, an MTC terminal may refer to a terminal which is defined as a specific category to support a low cost (or low complexity) and/or coverage enhancement.

In other words, in this specification, the MTC terminal may refer to newly defined 3GPP Release-13 low cost (or low complexity) UE category/type which performs an LTE based MTC related operation. Alternatively, in this specification, the MTC terminal may refer to an UE category/type defined in an existing 3GPP Release-12 or lower which supports an enhanced coverage as compared with the existing LTE coverage or supports low power consumption or a newly defined Release-13 low cost (or low complexity) UE category/type.

The wireless communication system in the present disclosure is widely disposed to provide various communication services such as voice, packet data, and the like. The wireless communication system includes user equipment (UE) and a base station (BS or eNB). In this specification, the user terminal is a comprehensive concept which means a terminal in a wireless communication and needs to be interpreted as a concept which includes not only user equipment (UE) in a widenband code division multiple access (WCDMA), LTE, and high speed packet access (HSPA) but also a mobile station (MS), a user terminal (UT), a subscriber station (SS), and a wireless device in a GSM.

A base station or a cell generally refers to a station in which communication with a user terminal is performed and is also referred to as another terminology such as a node-B, evolved node-B (eNB), a sector, a site, a base transceiver system (BTS), an access point, a relay node, a remote radio head (RRH), a radio unit (RU), or a small cell.

That is, in this specification, the base station or the cell needs to be interpreted as a comprehensive meaning indicating a partial area or function covered by a base station controller (BSC) in the CDMA, a Node-B of WCDMA, or an eNB or a sector (site) in an LTE and is a meaning including all various coverage areas such as a megacell, a macrocell, a microcell, a picocell, a femtocell, a relay node, an RRH, an RU, and a small cell communication range.

In various cells listed above, there is a base station which controls each cell, so that the base station may be interpreted by two meanings. First, the base station may be a device itself which provides a megacell, a macrocell, a microcell, a picocell, a femtocell, or a small cell in relation to the wireless area or second, the base station may indicate the wireless area itself. According to the first meaning, when devices which provide a predetermined wireless area are controlled by the same entity or interact to configure the wireless area in cooperation with each other, all the devices are indicated as base stations. Depending on a configuring method of a wireless area, an eNB, a RRH, an antenna, a RU, an LPN, a point, a transmission/reception point, a transmission point, and a reception point may be examples of the base station. According to the second meaning, the wireless area in which a signal is transmitted or received by a user terminal or a neighboring base station may be indicated as a base station.

Therefore, the megacell, the macrocell, the microcell, the picocell, the femtocell, the small cell, the RRH, the antenna, the RU, the low power node (LPN), the point, the eNB, the transmission/reception point, the transmission point, and the reception point are collectively referred to as a base station.

In this specification, the user terminal and the base station are two transmission and reception subjects used to implement a technique or a technical spirit described in this specification and are used as comprehensive meanings, but are not limited by a terminology or a word which is specifically referred to. The user terminal and the base station are as two (uplink or downlink) transmission and reception subjects used to implement a technique or a technical idea described in this specification and used as a comprehensive meaning, but are not limited by a terminology or a word which is specifically referred to. Here, the uplink (UL) means a method for transmitting and receiving data to the base station by a user terminal and the downlink (DL) means a method for transmitting and receiving data to the user terminal by the base station.

There is no limitation on multiple access technique which is applied to a wireless communication system. Various multiple access techniques may be used, such as code division multiple access (CDMA), time division multiple access (TDMA), frequency division multiple access (FDMA), orthogonal frequency division multiple access (OFDMA), OFDM-FDMA, OFDM-TDMA, and OFDM-CDMA. An exemplary embodiment of the present disclosure may be applied to resource allocation such as asynchronous wireless communication which evolves into LTE and LTE-advanced through GSM, WCDMA, and HSPA and synchronous wireless communication which evolves into CDMA, CDMA-2000, and UMB. The present disclosure should not be interpreted to be restricted or limited to a specific wireless communication field and should be interpreted to include all technical fields to which a spirit of the present disclosure is applicable.

Herein, a time division duplex (TDD) technique performs transmission by using different times, and a frequency division duplex (FDD) technique performs transmission by using different frequencies. Such a TDD technique or the FDD technique may be used for uplink transmission and downlink transmission.

Further, in a system such as LTE or LTE-advanced, the uplink and the downlink are configured with respect to one carrier or a pair of carriers to configure a specification. The uplink and the downlink transmit control information through a control channel such as a physical downlink control channel (PDCCH), a physical control format indicator channel (PCFICH), a physical hybrid ARQ indicator channel (PHICH), a physical uplink control channel (PUCCH), or an enhanced physical downlink control channel (EPDCCH) and are configured by a data channel such as a physical downlink shared channel (PDSCH) or a physical uplink shared channel (PUSCH) to transmit data.

In the meantime, the control information may be transmitted also using enhanced PDCCH or extended PDCCH (EPDCCH).

In this specification, the cell may refer to a coverage of a signal transmitted from a transmission/reception point or a component carrier which has a coverage of a signal transmitted from a transmission/reception point (a transmission point or a transmission/reception point), or a transmission/reception point itself.

The wireless communication system to which the exemplary embodiments are applied may be a coordinated multi-point transmission/reception system (CoMP system), a coordinated multi-antenna transmission system, or a coordinated multi-cell communication system in which two or more transmission/reception points cooperate to transmit a signal. The CoMP system may include at least two multi transmission/reception points and terminals.

The multi transmission/reception point may be a base station or a macro cell (hereinafter, referred to as an 'eNB') and at least one RRH which is connected to the eNB by an optical cable or an optical fiber to be wirely controlled and has a high transmission power or low transmission power in the macro cell area.

Hereinafter, the downlink refers to communication or a communication channel from the multiple transmission/reception point to the terminal and the uplink refers to communication or a communication channel from the terminal to the multiple transmission/reception point. In the downlink, a transmitter may be a part of the multiple transmission/reception point and a receiver may be a part of the terminal. In the uplink, a transmitter may be a part of the terminal and a receiver may be a part of multiple transmission/reception point.

Hereinafter, a situation in which a signal is transmitted or received through a channel such as PUCCH, PUSCH, PDCCH, EPDCCH, and PDSCH may be described that PUCCH, PUSCH, PDCCH, EPDCCH, and PDSCH are transmitted or received.

Further, hereinafter, a description that PDCCH is transmitted or received or a signal is transmitted or received through PDCCH may also mean that EPDCCH is transmitted or received or a signal is transmitted or received through EPDCCH.

That is, a physical downlink control channel which will be described below may refer to PDCCH or EPDCCH or may be used as a meaning including both PDCCH and EPDCCH.

Further, for the convenience of description, EPDCCH which is an exemplary embodiment of the present disclosure may be applied to a portion described as PDCCH and PDCCH may also be applied to a portion described as EPDCCH, as an exemplary embodiment of the present disclosure.

In the meantime, high layer signaling which will be described below includes RRC signaling which transmits RRC information including an RRC parameter.

The eNB performs downlink transmission to the terminals. The eNB may transmit a physical downlink shared channel (PDSCH) which is a main physical channel for unicast transmission and a physical downlink control channel (PDCCH) for transmitting downlink control information such as scheduling required to receive PDSCH and scheduling approval information for transmission in an uplink data channel (for example, a physical uplink shared channel (PUSCH)). Hereinafter, when the signal is transmitted or received through each channel, it is described that the corresponding channel is transmitted or received.

[Rel-13 BL/CE UEs for MTC Operation]

As an LTE network spreads, a mobile communication service provider wants to minimize a number of radio access terminals (RAT) to reduce a network maintenance cost. However, MTC products based on a GSM/GPRS network of the related art are increased and the MTC which uses a low data transmission rate may be provided at a low cost. Therefore, the mobile communication service provider uses an LTE network for general data transmission and a GSM/GPRS network for MTC so that two RATs are individually operated, which is an inefficient utilization of a frequency band and may be a burden on the profit of the mobile communication service provider. Therefore, in order to reduce a unit price of a terminal as compared with an existing normal LTE terminal, in consideration of an MTC application scenario such as a bandwidth reduced low complexity (BL) UE in which a transmission/reception bandwidth of the terminal is limited to six PRBs (physical resource blocks) and the number of transmission/reception antennae is limited to one or smart metering installed in a 'deep indoor' environment such as a basement, a coverage enhancement (CE) mode is defined as a CE UE and a standard technology for supporting the BL/CE UE is defined in LTE rel-13 system.

[CE Mode Definition]

In the LTE rel-13 system, as a coverage enhancement mode for a BL/CE terminal, CEModeA and CEModeB are defined. The CEModeA is a terminal operation mode in which repetition for a wireless channel such as MPDCCH, PDSCH, PUSCH, and PUCCH for coverage enhancement of the BL/CE terminal is not applied or a reduced number of repetitions is applied. The CEModeB is a terminal operation mode in which a large number of repetitions is applied to the wireless channels for coverage enhancement. The CEmode is defined to be set for every terminal to perform signaling.

[Narrowband Definition]

As described above, in the case of Rel-13 BL/CE terminal, regardless of the system bandwidth, transmission/reception is performed only for about 1.4 MHz (that is, six PRBs) through an arbitrary sub frame. By doing this, a transmission/reception band of an arbitrary BL/CE terminal is defined in an arbitrary up/downlink sub frame and a narrowband configured by six consecutive PRBs is defined as a unit for allocation thereof. Further, depending on each system bandwidth, $$NB_{whole} = \left\lfloor \frac{N_{RB}^{DL}}{6} \right\rfloor$$

downlink narrowbands and $$NB_{whole} = \left\lfloor \frac{N_{RB}^{UL}}{6} \right\rfloor$$

uplink narrowbands are configured. When the narrowband is configured in the arbitrary system bandwidth, a remaining RB(s) corresponding to a remainder obtained by dividing the total number of PRBs which configure the system bandwidth by 6 is evenly located at both band edges of the system band (when the system bandwidth is configured by an even number of PRBs) or located at a center of the system band (when the system band is configured by 25 PRBs), or located at both edges and the center of the system band (when the system band is 15 PRBs and 75 PRBs) and six consecutive PRBs are grouped by increasing PRB number using the remaining PRBs to configure the narrowband.

A narrowband configuring method which is specifically defined in TS36.211 document is as follows:

[TS36.211 v13.2.0]

[Downlink Narrowbands]

6.2.7 Narrowbands

A narrowband is defined as six non-overlapping consecutive physical resource blocks in the frequency domain. The total number of downlink narrowbands in the downlink transmission bandwidth configured in the cell is given by $$N_{NB}^{DL} = \left\lfloor \frac{N_{RB}^{DL}}{6} \right\rfloor.$$

The narrowbands are numbered $n_{NB}=0, \ldots, N_{NB}^{DL}-1$ in order of increasing physical resource-block number where narrowband $n_{NB}$ is composed of physical resource-block indices $$\begin{cases} 6n_{NB} + i_0 + i & \text{if } N_{RB}^{DL} \bmod 2 = 0 \\ 6n_{NB} + i_0 + i & \text{if } N_{RB}^{DL} \bmod 2 = 1 \text{ and } n_{NB} < N_{NB}^{DL}/2 \\ 6n_{NB} + i_0 + i + 1 & \text{if } N_{RB}^{DL} \bmod 2 = 1 \text{ and } n_{NB} \geq N_{NB}^{DL}/2 \end{cases}$$

-continued where $i = 0, 1, \ldots, 5$ $$i_0 = \left\lfloor \frac{N_{RB}^{DL}}{2} \right\rfloor - \frac{6N_{NB}^{DL}}{2}.$$

[Uplink Narrowbands]

5.2.4 Narrowbands

A narrowband is defined as six non-overlapping consecutive physical resource blocks in the frequency domain. The total number of uplink narrowbands in the uplink transmission bandwidth configured in the cell is given by $$N_{NB}^{UL} = \left\lfloor \frac{N_{RB}^{UL}}{6} \right\rfloor.$$

The narrowbands are numbered $n_{NB}=0, \ldots, N_{NB}^{UL}-1$ in order of increasing physical resource-block number where narrowband $n_{NB}$ is composed of physical resource-block indices $$\begin{cases} 6n_{NB} + i_0 + i & \text{if } N_{RB}^{UL} \bmod 2 = 0 \\ 6n_{NB} + i_0 + i & \text{if } N_{RB}^{UL} \bmod 2 = 1 \text{ and } n_{NB} < N_{NB}^{UL}/2 \\ 6n_{NB} + i_0 + i + 1 & \text{if } N_{RB}^{UL} \bmod 2 = 1 \text{ and } n_{NB} \geq N_{NB}^{UL}/2 \end{cases}$$

where $i = 0, 1, \ldots, 5$ $$i_0 = \left\lfloor \frac{N_{RB}^{UL}}{2} \right\rfloor - \frac{6N_{NB}^{UL}}{2}.$$

[Further Enhanced MTC]

As described above, additional enhanced feature for the BL/CE terminal defined in 3GPP rel-13 will be discussed in 3GPP rel-14 system, and a specific scope is extracted from the following WID document RP-161321 to be attached.

[RP-161321]

3 Justification

The provision of Internet of things (IoT) via cellular networks is proving to be a significant opportunity for mobile operators. In Release 13, two classes of low-cost IoT devices with enhanced coverage, and long battery life are specified: eMTC devices and NB-IoT devices with UE bandwidths of 6 PRBs and 1 PRB, respectively (1 PRB=a 180-kHz physical resource block).

UE positioning and tracking are important in many IoT applications, such as asset tracking. But GNSS-based positioning method is not appropriate for many IoT applications. Additionally, the narrow UE bandwidth poses challenges for the positioning accuracy when using the 3GPP positioning functionalities defined for normal UEs. In Rel-13, only limited positioning functionalities are provided for these UEs. Hence completing the core requirements from Rel-13 and considering improvements of the 3GPP positioning methods are necessary to improve the 3GPP-based IoT eco-system.

When many devices in the same cell need to receive the same information simultaneously, for example in case of rollout of firmware or software upgrades, it is in many cases more efficient to use multicast transmission instead of unicast transmission. Low complexity multicast functionality can be introduced either in the form of a narrowband format of the regular MBSFN transmission functionality or as a small extension of the recently introduced single-cell point-to-multipoint transmission (SC-PtM) functionality.

In Rel-13 the requirements of complexity reduction, extended battery life, and coverage enhancements aimed at devices such as sensors, meters, smart readers, and similar. Other types of devices/use cases, such as voice capable wearable devices and health monitoring devices share some of these requirements. However, a subset of these devices are not fully covered by the Rel-13 improvements because they require higher data rates above 1 Mbps, mobility, and they may support services that are more delay sensitive. It is important to address such use cases with higher data rate requirements and with mobility compared to those addressed by Rel-13 eMTC while maximally harvesting the power consumption and complexity reduction and link budget enhancements features enabled by using the existing Rel-13 eMTC solution.

4 Objective 4.1 Objective of SI or Core Part WI or Testing Part WI

The objective is to specify the following improvements for machine-type communications for BL/CE (eMTC) UEs.

Positioning [RAN4, RAN1]

E-CID: RSRP/RSRQ measurement

E-CID: UE Rx-Tx time difference measurement

OTDOA: core requirements

From RAN#73: (considering the outcome of the NB-IoT) accuracy, UE complexity and power consumption for OTDOA can be studied Multicast [RAN2 Lead, RAN1]

Extend Rel-13 SC-PTM to support multicast downlink transmission (e.g. firmware or software updates, group message delivery)

Introduction of necessary enhancements to support narrowband operation, e.g. support of MPDCCH, and coverage enhancement, e.g. repetitions Mobility Enhancements [RAN4 Only]

Full standard support for inter-frequency measurements for eMTC [RAN4]

Higher Data Rates [RAN1, RAN2, RAN4]

Specify HARQ-ACK bundling in CE mode A in HD-FDD

Larger maximum TBS

Larger max. PDSCH/PUSCH channel bandwidth in connected mode at least in CE mode A in order to enhance support e.g. voice and audio streaming or other applications and scenarios Up to 10 DL HARQ processes in CE mode A in FD-FDD VoLTE Enhancements [RAN1, RAN2]

From RAN#73: Based on outcome from VoLTE study item

The present disclosure suggests a narrow band configuring method for a new rel-14 MTC terminal (which will be referred to as a HeMTC terminal for the convenience of description in the present disclosure, but the present disclosure is not limited to the terminology) which supports a PDSCH/PUSCH channel bandwidth extended as compared with rel-13 BL/CE terminal.

Method 1. Definition of System-Specific Narrowband Type-2

As a narrowband configuring method for an HeMTC terminal, a system-specific type-2 narrowband configured by arbitrary consecutive or non-consecutive N PRBs (in this case, N>6) will be additionally defined in addition to the above described narrowband configured by six consecutive PRBs defined for the rel-13 BL/CE UE.

In this case, the PRBs configure the system-specific type-2 narrowband, and the RPBs may be determined as a function of a system bandwidth $N_{RB}^{DL}$.

That is, a size, an N value, and a position of the N PRBs of the type-2 narrowband may be determined in accordance with the system bandwidth.

For example, as represented in the following Table 1, the size and the N value of the type-2 narrowband are determined in accordance with the system bandwidth. In this case, N1, N2, N3, N4, and N5 are defined to have arbitrary natural numbers which satisfy 6<N1≤N2≤N3≤N4≤N5, respectively.

TABLE 1

System bandwidth vs. type-2 narrowband size, N

| System bandwidth, $N_{RB}^{DL}$ | Type-2 narrowband size, N |
|---|---|
| 1.4 MHz(6 PRBs) | N/A |
| 3 MHz(15 PRBs) | N1 |
| 5 MHz(25 PRBs) | N2 |
| 10 MHz(50 PRBs) | N3 |
| 15 MHz(75 PRBs) | N4 |
| 20 MHz(100 PRBs) | N5 |

In this case, as a first method to determine specific N1 to N5 in Table 1, the values of N1 to N5 may be defined so that there is no remaining RB(s), which is different from the typical narrowband configuring method for the rel-13 BL/CE terminal. Accordingly, for $N_{RB}^{DL}$ PRBs which configure the entire system band, N consecutive PRBs are grouped in order of increasing PRB number from PRB #0 to PRB #($N_{RB}^{DL}$−1) to configure $N_{RB}^{DL}$/N type-2 narrowbands from type-2 narrowband #0 to #($N_{RB}^{DL}$/N).

For example, specific N1 to N5 in accordance with the system bandwidths may have values represented in the following Table 2. In this case, when the system bandwidths are 3 MHz and 5 MHz, one type-2 narrowband is configured over the entire system bandwidths. Further, when the system bandwidths are 10 MHz, 15 MHz, and 20 MHz, two, three, and four type-2 narrowbands may be configured, respectively. However, the values in Table 2 are examples for determining the values of N1 to N5 without remaining RB(s). Therefore, all cases when the specific values of N1 to N5 are determined in accordance with the system bandwidth without having the remaining RB(s) may be included in the scope of the present disclosure.

TABLE 2

Example of determination of type-2 narrowband size, N

| System bandwidth, $N_{RB}^{DL}$ | Type-2 narrowband size, N |
|---|---|
| 1.4 MHz(6 PRBs) | N/A |
| 3 MHz(15 PRBs) | 15 |
| 5 MHz(25 PRBs) | 25 |
| 10 MHz(50 PRBs) | 25 |
| 15 MHz(75 PRBs) | 25 |
| 30 MHz(100 PRBs) | 25 |

As another method for determining specific N1 to N5 in Table 1, the type-2 narrowband may be configured in the unit of rel-13 narrowband defined for the existing rel-13 BL/CE terminal.

That is, the type-2 narrowband may be defined as a group of narrowbands defined in rel-13. In this case, the type-2 narrowband or narrowband group is configured by a set of K consecutive rel-13 narrowbands. Such a narrowband group is also referred to as a wideband.

In this case, the number of rel-13 narrowbands which configure the type-2 narrowband or the narrowband group may vary depending on the system bandwidth.

For example, the K value may be determined in accordance with the system bandwidth as represented in the following Table 3. In this case, each rel-13 narrowband index configures the narrowband group in accordance with the K value, and each rel-13 narrowband index may sequentially configure the narrow group by grouping K consecutive narrowbands in order of increasing narrowband number for $$\left\lfloor \frac{N_{RB}^{CL}}{6} \right\rfloor$$

narrowbands from #0 to $$\left( \left\lfloor \frac{N_{RB}^{CL}}{6} \right\rfloor - 1 \right).$$

For example, in the following Table 3, when the system bandwidth is 20 MHz, a total of 16 rel-13 narrowbands from narrowband #0 to #15 are configured by a total of 96 PRBs excluding PRBs #0 and #1 and PRBs #98 and #99. Further, four consecutive narrowbands are grouped in order of increasing narrowband numbers of rel-13 narrowbands #0 to #15 to additionally configure four narrowband groups (or a type-2 narrowband) from narrowband groups #0 to #3.

In this case, the values in Table 3 are one example for determining the type-2 narrowband, that is, narrowband group as a set of rel-13 narrowbands and all cases when a narrowband group based on the rel-13 narrowband for the HeMTC terminal may be included in the scope of the present disclosure.

TABLE 3

Example of determination of narrowband group size, K

| System bandwidth, $N_{RB}^{DL}$ | Number of narrowbands in a narrowband group(or type-2 narrowband), K |
|---|---|
| 1.4 MHz(6 PRBs) | N/A |
| 3 MHz(15 PRBs) | 2 |
| 5 MHz(25 PRBs) | 4 |
| 10 MHz(50 PRBs) | 4 |
| 15 MHz(75 PRBs) | 4 |
| 20 MHz(100 PRBs) | 4 |

As another method for configuring the system-specific type-2 narrowband, the number of PRBs which configure the type-2 narrowband for the HeMTC terminal, that is, the N value may be determined as a single value regardless of the system bandwidth. In this case, the N value may be determined as one of 15, 25, 50, 75, and 100 or determined as a set of the rel-13 narrowbands.

Method 2. Definition of Cell-Specific Narrowband Type-2

As a narrowband configuring method for an HeMTC terminal, a cell-specific type-2 narrowband configured by arbitrary consecutive or non-consecutive N PRBs (in this case, N>6) will be additionally defined in addition to the above described narrowband configured by six consecutive PRBs defined for the rel-13 BL/CE UE.

In this case, PRBs allocation information for configuring the cell-specific type-2 narrowband may be transmitted to the HeMTC terminal in the corresponding cell through cell-specific RRC signaling such as a master information block (MIB) or a system information block (SIB) which is transmitted for the HeMTC or the rel-13 BL/CE terminal.

Specifically, the N value may be transmitted through the MIB and SIB, here the N value is the number of PRBs configuring the type 2 narrowband. In this case, candidate values of the N value may be set through the cell-specific RRC signaling, and such candidate values of the N value may have a common value regardless of the system bandwidth or a separate value in accordance with the system bandwidth.

Here, similarly to the exemplary embodiment described in the method 1, the type-2 narrowband size and the N values which may be set through the cell-specific RRC signaling and a method for configuring the type-2 narrowband in accordance with the type-2 narrowband size, and the N values may be set by configuring the type-2 narrowband without having the remaining RBs or may be configured as a narrowband group having the rel-13 narrowband as a unit to be set for every cell through the above-described cell-specific RRC signaling.

Method 3. Definition of UE-Specific Narrowband Type-2

As a narrowband configuring method for an HeMTC terminal, a UE-specific type-2 narrowband configured by arbitrary consecutive or non-consecutive N PRBs (in this case, N>6) will be additionally defined in addition to the above described narrowband configured by six consecutive PRBs defined for the rel-13 BL/CE UE.

In this case, PRBs allocation information for configuring the UE-specific type-2 narrowband may be transmitted to each HeMTC terminal through the UE-specific RRC signaling. To this end, when the N value is the number of PRBs which configure the type-2 narrowband for every HeMTC terminal, such a N value may be transmitted through the UE-specific RRC signaling. In this case, candidate values of the N value may be set through the UE-specific RRC signaling, and the candidate values of the N value may have a common value regardless of the system bandwidth or a separate value in accordance with the system bandwidth.

As another method for configuring the UE-specific type-2 narrowband, the UE-specific type-2 narrowband may be determined in accordance with capability of the HeMTC terminal. That is, when the N value is the number of PRBs for configuring the UE-specific type-2 narrowband, such a N value is determined by the capability of the HeMTC terminal. Thus, a separate UE-specific type-2 narrowband for every HeMTC terminal may be configured.

Similarly to the exemplary embodiment described in the method 1 and the method 2, a method for allocating specific PRBs for configuring the UE-specific type-2 narrowband described above, that is, the UE-specific type-2 narrowband size, the N values, and the method for configuring the type-2 narrowband in accordance with the UE-specific type-2 narrowband size and the N values may be set by configuring the UE-specific type-2 narrowband without having the remaining RBs or may be configured as a UE-specific narrowband group having the rel-13 narrowband as a unit to be set for every cell through the above-described UE-specific RRC signaling.

Additionally, in the present disclosure, although a method for configuring the type-2 narrowband for the HeMTC terminal based on the downlink has been described, it is obvious that the same method is applied to the uplink.

FIG. 1 illustrates a method for configuring a radio resource in a wireless communication system according to one embodiment.

Referring to FIG. 1, a narrowband is configured at step S100. Herein, the narrowband is defined as six consecutive PRBs in a physical resource block (PRB) which configures an entire system bandwidth of a wireless communication system.

A wideband is configured at step S110. Herein, the wideband is defined as K non-overlapping narrowbands in the narrowband configured in the wireless communication system.

Here, when K is the number of narrowbands which configure one wideband, such K may be determined based on the system bandwidth. That is, the number of narrowbands which configure one wideband may be determined in accordance with the number of narrowbands which configure the system bandwidth.

Alternatively, the entire narrowbands which configure the system bandwidth may configure one wideband regardless with the system bandwidth.

One wideband is configured by a plurality of narrowbands, and the wideband is configured in order of increasing narrowband number.

Information on the wideband configured by the plurality of narrowbands is transmitted to the BL/CE UE so that the BL/CE UE may use a radio resource extended as compared with 3GPP release-13 in the uplink/downlink.

Figure 2:
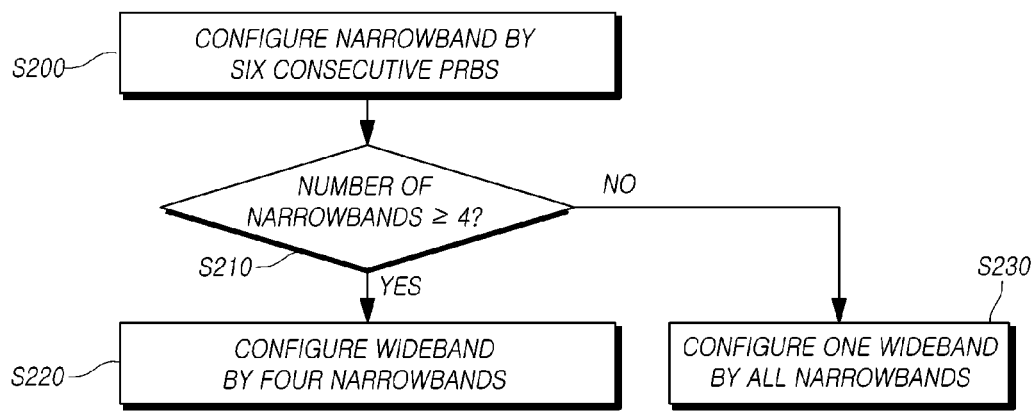
FIG. 2 is a view illustrating a method for configuring a radio resource in a wireless communication system according to another exemplary embodiment.

FIG. 2 illustrates a method for configuring a radio resource in a wireless communication system according to another embodiment.

Referring to FIG. 2, a narrowband is configured using six consecutive PRBs which configure the entire system bandwidth in the wireless communication system at step S200.

Further, the wideband is configured using K non-overlapping narrowbands in the narrowband which configures the system bandwidth.

In this case, when K is the number of narrowbands which configure one wideband, such K may be determined based on the system bandwidth. That is, the number of narrowbands which configure one wideband may be determined in accordance with the number of narrowbands which configure the system bandwidth.

For example, when the number of narrowbands which configure the entire system bandwidths is equal to or greater than 4 (Yes-S210), the wideband is configured using four non-overlapping narrowbands at step S220. When the number of narrowbands which configure the entire system bandwidths is smaller than 4 (No-S210), one wideband is configured using all narrowbands which configure the system bandwidth at step S230.

That is, when the number of narrowbands which configure the entire system bandwidth is equal to or greater than 4, the number of widebands which configure the system bandwidth corresponds to a quotient obtained by dividing the number of total narrowbands which configure the system bandwidth by four. When the number of narrowbands which configure the system bandwidth is smaller than 4, one wideband configures the system bandwidth.

The BL/CE UE of 3GPP release-13 may utilize a radio resource extended as compared with the 3GPP release-13 in the same system bandwidth by allocating the radio resource using a wideband configured by a plurality of narrowbands.

Figure 3:
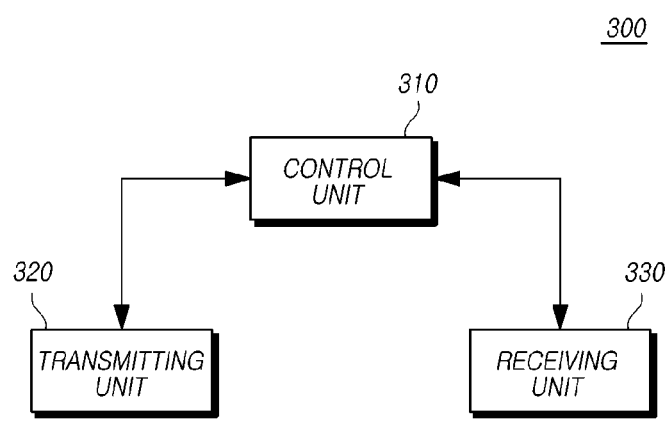
FIG. 3 is a view illustrating a configuration of a base station according to exemplary embodiments.

FIG. 3 is a view illustrating a configuration of a base station 300 according to exemplary embodiments.

Referring to FIG. 3, a base station 300 according to the present exemplary embodiments includes a control unit 310, a transmitting unit 320, and a receiving unit 330.

The control unit 310 controls an overall operation of the base station 300 in accordance with a narrowband configuration for a new rel-14 MTC terminal which supports PDSCH/PUSCH channel bandwidth extended as compared with rel-13 BL/CE terminal required to implement the above-described disclosure.

The transmitting unit 320 and the receiving unit 330 are used to transmit and receive signals, messages, and data required to implement the present disclosure to and from the terminal.

Figure 4:
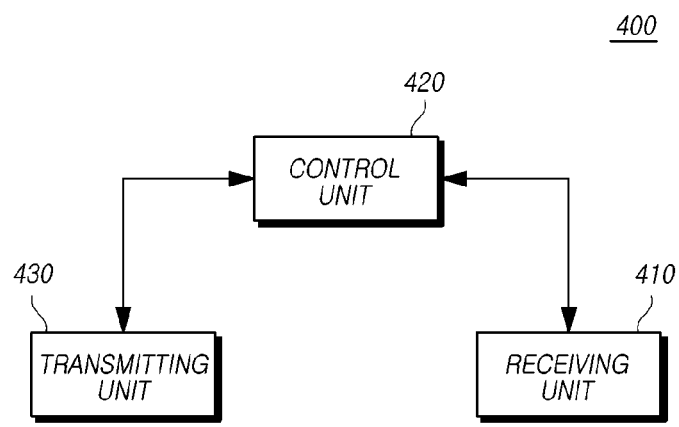
FIG. 4 is a view illustrating a configuration of a user terminal according to exemplary embodiments.

FIG. 4 is a view illustrating a configuration of a user terminal 400 according to exemplary embodiments.

Referring to FIG. 4, a user terminal 400 according to the present exemplary embodiments includes a receiving unit 410, a control unit 420, and a transmitting unit 430.

The receiving unit 410 receives downlink control information, data, and messages through a corresponding channel from the base station.

Further, the control unit 420 controls an overall operation of the user terminal 400 in accordance with a narrowband configuration for a new rel-14 MTC terminal which supports PDSCH/PUSCH channel bandwidth extended as compared with rel-13 BL/CE terminal required to implement the above-described disclosure.

The transmitting unit 430 transmits uplink control information, data, and messages through a corresponding channel from the base station.

Standard contents and standard documents mentioned in the above-described exemplary embodiments are omitted for simplicity of description of the specification and configure a part of the specification. Therefore, it should be interpreted that when partial contents of the standard contents and standard documents are added to the specification or described in the claims, it is also covered by the scope of the present disclosure.

It will be appreciated that various exemplary embodiments of the present disclosure have been described herein for purposes of illustration, and that various modifications, changes, and substitutions may be made by those skilled in the art without departing from the scope and spirit of the present disclosure. Therefore, the exemplary embodiments of the present disclosure are provided for illustrative purposes only but not intended to limit the technical spirit of the present disclosure. The scope of the technical spirit of the present disclosure is not limited thereto. The protective scope of the present disclosure should be construed based on the following claims, and all the technical concepts in the equivalent scope thereof should be construed as falling within the scope of the present disclosure.

What is claimed is:

1. A method for configuring an uplink radio resource in a wireless communication system, the method comprising:
configuring a narrowband defined as six consecutive physical resource blocks which configure a uplink system bandwidth; and
configuring a wideband defined as K non-overlapping narrowbands in the narrowbands which configure the uplink system bandwidth and each of which is made up of six consecutive physical resource block, where K is an integer number greater than 0,
wherein the configuring a wideband includes: determining the number of narrowbands to configure one wideband based on the number of narrowbands configuring the uplink system bandwidth,
wherein when the number of narrowbands which configure the uplink system bandwidth is equal to or greater than 4, the narrowbands are numbered from a narrowband number 0 to a $$\left(\left\lfloor \frac{N_{RB}}{6} \right\rfloor - 1\right),$$

narrowband number and four consecutive narrowbands are grouped in an increasing order of the narrowband numbers so that each of the wideband is defined as four non-overlapping narrowbands, where $N_{RB}$ denotes a number of physical resource blocks for configuring the uplink $$\left\lfloor \frac{N_{RB}}{6} \right\rfloor$$

system bandwidth and is a greatest integer less than or equal to a quotient after dividing $N_{RB}$ by 6, and
when the number of narrowbands which configure the uplink system bandwidth is smaller than 4, a size of the wideband is defined as all narrowbands which configure the uplink system bandwidth.

2. The method according to claim 1, wherein when the number of narrowbands which configure the uplink system bandwidth is equal to or greater than 4, the number of widebands corresponds to a quotient obtained by dividing the number of total narrowbands which configure the uplink system bandwidth by four.

3. The method according to claim 1, wherein when the number of narrowbands which configure the uplink system bandwidth is smaller than 4, the number of widebands which configure the uplink system bandwidth is 1.

4. The method according to claim 1, wherein the number of widebands which configure the uplink system bandwidth, and the number of narrowbands which configure the wideband are determined based on the uplink system bandwidth.

5. A method for configuring a downlink radio resource in a wireless communication system, the method comprising:
configuring a narrowband defined as six consecutive physical resource blocks which configure a downlink system bandwidth; and
configuring a wideband defined as K non-overlapping narrowbands in the narrowbands which configure the downlink system bandwidth and each of which is made up of six consecutive physical resource blocks, where K is an integer number greater than 0,
wherein the configuring a wideband includes: determining the number of narrowbands to configure one wideband based on the number of narrowbands configuring the uplink system bandwidth,
wherein when the number of narrowbands which configure the system bandwidth is equal to or greater than 4, the narrowbands are numbered from a narrowband number 0 to a narrowband $$\left(\left\lfloor \frac{N_{RB}}{6} \right\rfloor - 1\right),$$

number and four consecutive narrowbands are grouped in an increasing order of the narrowband numbers so that each of the wideband is defined as four non-overlapping narrowbands, where $N_{RB}$ denotes a number of physical resource blocks for configuring the uplink system bandwidth $$\left\lfloor \frac{N_{RB}}{6} \right\rfloor$$

and is a greatest integer less than or equal to a quotient after dividing $N_{RB}$ by 6, and wherein when the number of narrowbands which configure the system bandwidth is smaller than 4, a size of the wideband is defined as all narrowbands which configure the system bandwidth.

6. The method according to claim 5, wherein when the number of narrowbands which configure the uplink system bandwidth is equal to or greater than 4, the number of widebands corresponds to a quotient obtained by dividing the number of total narrowbands which configure the uplink system bandwidth by four.

7. The method according to claim 5, wherein when the number of narrowbands which configure the uplink system bandwidth is smaller than 4, the number of widebands which configure the uplink system bandwidth is 1.

8. The method according to claim 5, wherein i) the number of widebands which configure the uplink system bandwidth and ii) the number of narrowbands which configure the wideband are determined based on the uplink system bandwidth.

9. A method for configuring a radio resource in a wireless communication system, the method comprising:
configuring a narrowband defined as six consecutive physical resource blocks in a frequency domain and configuring a system bandwidth; and
configuring a wideband defined as K non-overlapping narrowbands in the frequency domain which configures the system bandwidth, where K is an integer number greater than 0,
wherein the configuring a wideband includes: determining the number of narrowbands to configure one wideband based on the number of narrowbands configuring the system bandwidth,
wherein when the number of narrowbands which configure the system bandwidth is equal to or greater than 4, the narrowbands are numbered from a narrowband number 0 to a narrowband $$\left( \left\lfloor \frac{N_{RB}}{6} \right\rfloor - 1 \right),$$

number and four consecutive narrowbands are grouped in an increasing order of the narrowband numbers so that each of the wideband is defined as four non-overlapping narrowbands in the frequency domain, where $N_{RB}$ denotes a number of physical resource blocks for configuring $$\left\lfloor \frac{N_{RB}}{6} \right\rfloor$$

the uplink system bandwidth and denotes a quotient is a greatest integer less than or equal to a quotient after dividing $N_{RB}$ by 6, and
wherein when the number of narrowbands which configure the system bandwidth is smaller than 4, a size of the wideband is defined as all narrowbands which configure the system bandwidth.

10. The method according to claim 9, wherein when the number of narrowbands which configure the system bandwidth is equal to or greater than 4, the number of widebands corresponds to a quotient obtained by dividing the number of total narrowbands by four in the system bandwidth.

11. The method according to claim 9, wherein when the number of narrowbands which configure the system bandwidth is smaller than 4, i) the number of widebands which configure the system bandwidth is 1.

12. The method according to claim 9, wherein i) the number of widebands which configure the system bandwidth and ii) the number of narrowbands which configure the wideband are determined based on the system bandwidth.

* * * * *